(12) United States Patent
Kawakura et al.

(10) Patent No.: US 7,714,526 B2
(45) Date of Patent: May 11, 2010

(54) CONTROL DEVICE FOR A CLOSURE MEMBER OF A VEHICLE

(75) Inventors: Takayuki Kawakura, Kiryu (JP); Narimitsu Kobori, Kiryu (JP); Takao Arai, Kiryu (JP); Kenichi Hirano, Midori (JP); Masahiro Fueki, Isesaki (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 355 days.

(21) Appl. No.: 11/715,812

(22) Filed: Mar. 7, 2007

(65) Prior Publication Data

US 2007/0216330 A1 Sep. 20, 2007

(51) Int. Cl.
H02P 7/00 (2006.01)
(52) U.S. Cl. ...................... 318/432; 318/470
(58) Field of Classification Search ................. 318/432, 318/470
See application file for complete search history.

(56) References Cited

U.S. PATENT DOCUMENTS

| | | | |
|---|---|---|---|
| 6,297,609 B1 * | 10/2001 | Takahashi et al. | 318/484 |
| 6,806,664 B2 * | 10/2004 | Beishline | 318/280 |
| 6,840,113 B2 * | 1/2005 | Fukumura et al. | 73/760 |
| 7,205,734 B2 * | 4/2007 | Kidokoro | 318/268 |
| 7,224,136 B2 * | 5/2007 | Saitou et al. | 318/286 |
| 2005/0231342 A1 * | 10/2005 | Kim | 340/438 |
| 2005/0275363 A1 * | 12/2005 | Honma et al. | 318/280 |
| 2006/0082338 A1 * | 4/2006 | Bizard | 318/285 |

* cited by examiner

Primary Examiner—Bentsu Ro
Assistant Examiner—David S Luo
(74) Attorney, Agent, or Firm—Lumen Patent Firm

(57) ABSTRACT

The control device for a closure member of a vehicle according to the present invention comprises: estimated load calculation means (8b) for obtaining an estimated load from a rotation speed, acceleration, and drive voltage of a DC motor (3) for driving a closure member (9); motor torque calculation means (8b) for calculating a motor torque from the rotation speed and drive voltage of the motor; reference torque calculation means (8f) for calculating a reference torque based on a stationary state of the motor torque; and pinching determination means (8c) for determining a pinching of an object based on the estimated load, motor torque and reference torque, wherein the pinching determination means determines that there is no pinching when at least one of the estimated load and the motor torque is below the reference torque even when the estimated load is greater than a prescribed threshold value.

16 Claims, 13 Drawing Sheets

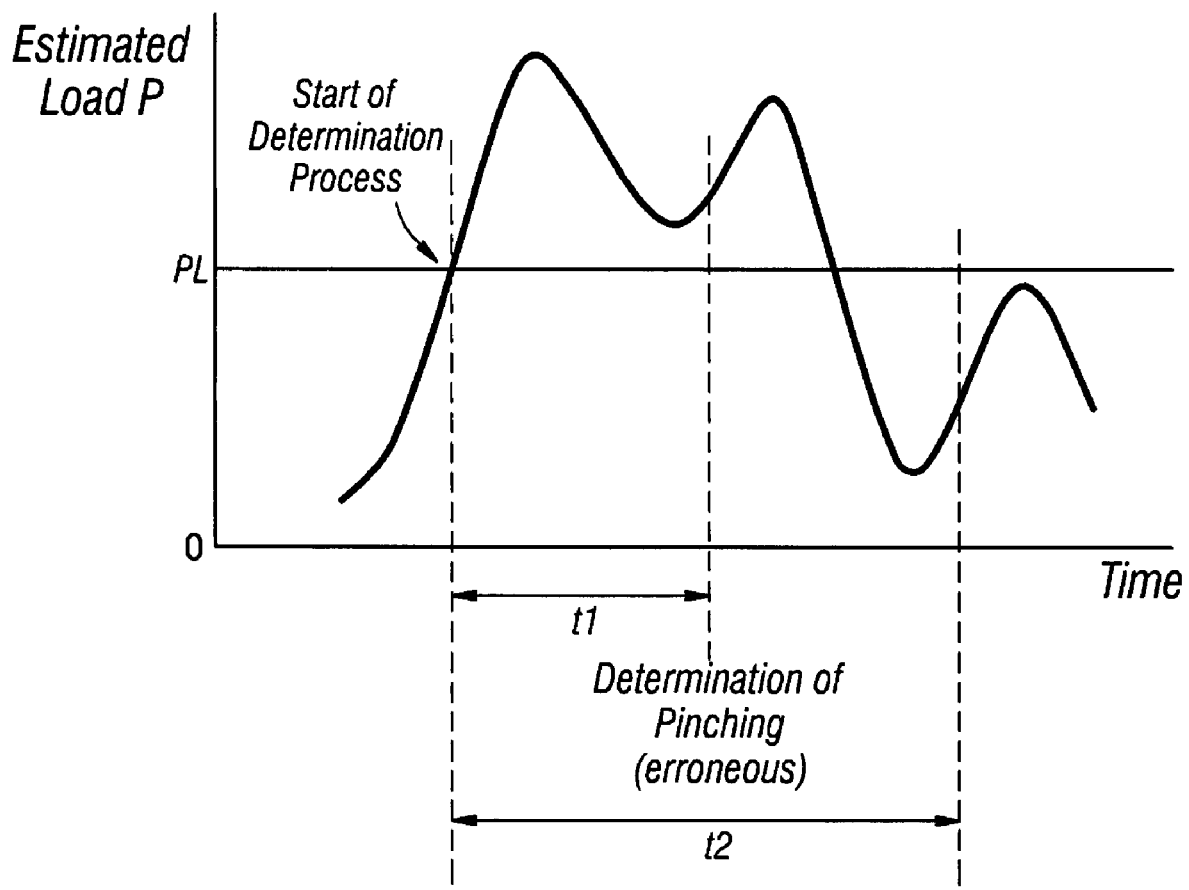

CONTROL DEVICE FOR A CLOSURE MEMBER OF A VEHICLE

TECHNICAL FIELD

The present invention relates to a control device for a closure member of a vehicle such as a windowpane or slide door of a vehicle. Particularly, the present invention relates to a control device for a closure member of a vehicle that can operate the closure member with a DC motor and detect a pinching of an object.

BACKGROUND OF THE INVENTION

Conventionally, there is known a closure member control device that uses a DC motor for driving and controlling a closure member of a vehicle, such as a windowpane or slide door. In such closure member control devices, it is required to stop or reverse the rotation of the motor when there is a pinching of a foreign object. In order to detect pinching of a foreign object, it is conceived to detect a motor load. The motor load can be obtained from the armature current and terminal voltage of the motor. However, the detection of electric current may require use of a current pick-up coil or a shunt resistor having a small resistance, and this would increase the number of component parts and thus increase the cost. For this reason, it is proposed to estimate the motor load from the motor voltage, angular speed and angular acceleration, and to determine that there is a pinching of a foreign object when a state of the estimated load being above a prescribed threshold value has continued for a prescribed time period (sometimes referred to as mask time) or longer (see Japanese Patent Application Laid-Open No. 2004-242425, for example).

In the above JPA Laid-Open No. 2004-242425, the estimated load P can be obtained by the following equation:

$$P = Bm(\omega 0 - \omega) + (Tm - Tm0) - Jm \cdot d\omega, \quad (1)$$

where Bm is a viscosity coefficient of motor internal load, $\omega$ is an angular speed, $\omega 0$ is a stationary angular speed with no outer load, Tm is a motor torque, Tm0 is a motor torque with no outer load, Jm is an inertial moment of the device (such as a window opening/closing device) inclusive of the motor, and $d\omega$ is an angular acceleration.

In the above equation, the term (Tm−Tm0) can be divided into the voltage and angular speed terms to be expressed by the following equation:

$$Tm = -a \cdot \omega + b \cdot V + c, \quad (2)$$

where a, b, c are constants specific to the motor. The equation (2) can be expressed in the form of a function or map for each motor and stored in a memory such as a ROM.

Using the equations (1) and (2), the estimated load P can be expressed as follows:

$$P = (Bm + a)(\omega 0 - \omega) + b(V - V0) - Jm \cdot d\omega, \quad (3)$$

where in the equation (3), (Bm+a) ($\omega 0 - \omega$) may be referred to as an angular speed difference computation term, b(V−V0) may be referred to as a voltage difference computation term, and Jm·d$\omega$ may be referred to as an angular acceleration computation term (or inertia term).

In the pinching determination based on the estimated load as above, if a disturbance is caused during the closing operation of the closure member due to travel of the vehicle on a road with surface irregularities, for example, the angular speed $\omega$ and/or angular acceleration d$\omega$ of the motor can change considerably, which can lead to a considerable change in the estimated load P and as a result, it may be erroneously determined that there is a pinched object when actually there is not. To solve such a problem, it has been proposed to vary the threshold value for pinching determination depending on the condition of the road (see Japanese Patent Application Laid-Open No. 9-328965, for example). In another publication, it is proposed to modify the threshold value for indicating a pinching of a foreign object so as to lower the pinching detection sensitivity when a disturbance is detected (see Japanese Patent Application Laid-Open No. 10-169310, for example). However, in order to eliminate the influence of oscillatory disturbance more effectively and achieve reliable pinching determination, a technique for more precise disturbance detection is needed.

Further, if a temporary large impact is imparted to the vehicle during the closing operation of the closure member, such as when a door is shut, the estimated load P can change abruptly, leading to an erroneous determination of pinching. It is proposed in Japanese Patent Application Laid-Open No. 9-125815 to increase the threshold value for pinching determination when a door closing action is detected by a door switch during an upward movement of the windowpane. However, the detection of door closing action using a door switch or the like can make the device complicated. Also, the increase in the threshold value may still result in an erroneous detection of pinching if there is a temporary large disturbance beyond the increased threshold value.

During the starting period of the motor, the motor operation tends to be unstable. Specifically, the angular speed $\omega$ and angular acceleration d$\omega$ can vary in a wide range and erroneous pinching determination tends to happen. For this reason, the pinching detection and determination was not conducted during a prescribed period (mask period) from the start-up of the motor, but in the case that a foreign object is already caught at the start-up of the motor, the load when a determination is made that there is a pinched object tends to be excessively large because the pinching determination process is started after the mask period has lapsed (see Japanese Patent Application Laid-Open No. 2005-83052).

Further, the characteristics of the motors can differ for individual motors and can also change during the operable period, and thus in order to detect a pinching of an object reliably and quickly, it is necessary to take into consideration the motor characteristics differences depending on individual motors and their temporal change.

Yet further, in the case where it is determined that there is a foreign object pinching when a state that the estimated load is above a prescribed threshold value has continued for a prescribed period of time or longer, the load when the determination of pinching is made (referred to as "pinching load") can be excessively large when the traveling speed of the closure member is fast (i.e., when the load increasing rate is large).

BRIEF SUMMARY OF THE INVENTION

The present invention is made to solve the above problems and a primary object of the present invention is to provide a control device for a closure member of a vehicle that uses a DC motor and can detect pinching of a foreign object reliably and quickly.

The second object of the present invention is to provide a control device for a closure member of a vehicle that can detect pinching of an object from immediately after the start-up of the motor without providing the mask period.

To achieve the above objects, the control device for a closure member of a vehicle according to the present invention may comprise: rotation speed detection means for detecting a rotation speed of a DC motor for driving the closure member; voltage detection means for detecting a drive voltage of the motor; acceleration calculation means for calculating an acceleration of the motor from the rotation speed of the motor; estimated load calculation means for obtaining an estimated load from the rotation speed, acceleration, and drive voltage of the motor; motor torque calculation means for calculating a motor torque from the rotation speed and drive voltage of the motor; reference torque calculation means for calculating a reference torque based on a stationary state of the motor torque and storing the reference torque in a memory; and pinching determination means for determining a pinching of an object based on the estimated load, the motor torque and the reference torque, wherein the pinching determination means determines that there is no pinching either when at least one of the estimated load and the motor torque is below the reference torque even when the estimated load is greater than a prescribed threshold value.

The reference torque can be preferably calculated by the reference torque calculation means when a state where a fluctuation range of the estimated load is within a prescribed range continues for a prescribed time period, wherein the reference torque is calculated as an average value of the motor torque in the prescribed time period.

Preferably, the reference torque calculation means may calculate the reference torque in both of an opening operation and a closing operation of the closure member.

In a case where the closure member is moved in an up-down direction, and the opening operation of the closure member is a downward movement of the closure member, it is preferred that the reference torque calculated in the opening operation is adjusted based on a weight of the closure member when the reference torque is used in the pinching determination in the closing operation of the closure member.

The pinching determination means may determine that there is a pinching of an object when a duration time during which the estimated load is continuously greater than the prescribed threshold value exceeds a prescribed reference time or when an amount of movement of the closure member during a state where the estimated load is greater than the prescribed threshold value exceeds a prescribed reference amount of movement According to the present invention, as described above, a reference torque (or stationary torque) is calculated by averaging the motor torque during when the estimated load is stationary and the pinching determination means determines that there is no pinching when at least one of the estimated load and the motor torque is below the reference torque even when the estimated load is greater than a prescribed threshold value (or performs a pinching determination process only when both of the estimated load and the motor torque exceed the reference torque). In this way, when the angular speed and angular acceleration of the motor fluctuate due to instability immediately after the start-up of the motor and cause a large increase in the estimated load, it is possible to effectively avoid an erroneous determination that the increase in the estimated load indicates a pinching of a foreign object. Thus, it is possible to perform pinching determination process from immediately after the start-up of the motor without providing a mask period.

By calculating the reference torque in both of the opening and closing operations of the closure member, it is possible to keep the reference torque updated, to thereby improve the determination accuracy. Particularly, in the case where the closure member is moved in an up-down direction and the opening operation of the closure member is a downward movement, if the reference torque calculated in the opening operation is adjusted based on the weight of the closure member when the reference torque is used in the pinching determination in the closing operation of the closure member, the accuracy of the pinching determination in the closing operation can be even more improved by using the adjusted reference torque.

The pinching determination means may determine that there is a pinching of an object when a duration time during which the estimated load is continuously greater than a prescribed threshold value exceeds a prescribed reference time or when an amount of movement of the closure member during a state where the estimated load is greater than the prescribed threshold value exceeds a prescribed reference amount of movement. In this way, when the speed of movement of the closure member is low, the pinching determination based on the duration time can be conducted to reliably detect a pinching while when the speed of movement of the closure member is high, the pinching determination can be based on the amount of movement of the closure member to achieve a pinching detection without causing an excessive pinching load.

The control device for a closure member of a vehicle may further comprise motor torque map calculation means for calculating a motor torque map in every closing operation of the closure member, where the motor torque map represents a change of motor torque with respect to a position of the closure member, wherein the pinching determination means adjusts the estimated load by subtracting therefrom a motor torque obtained by referring to the motor torque map based on the position of the closure member, and performs the pinching determination based on the adjusted estimated load. The motor torque map calculation means can calculate the motor torque map based on a changing state of the motor torque. Preferably, the motor torque map calculation means calculates an average value of the motor torque for every prescribed period, and set the average value of the motor torque to the corresponding prescribed period as an updated motor torque. Owing to such a motor torque map calculation means, it is possible to reflect the individual differences and temporal change of the motor characteristics as well as the sliding load of the closure member upon the motor torque map. Since the pinching determination means adjusts the estimated load by subtracting therefrom a motor torque obtained by referring to the motor torque map based on the closure member position, and determines a pinching of an object based on the adjusted estimated load, it is possible to eliminate the affects from the individual differences and temporal change of the motor characteristics to thereby detect only the load increase caused by pinching, which allows for highly accurate determination of pinching.

In one embodiment, the pinching determination means may store, as an inertial force peak value, a peak value of an absolute value of a difference between the estimated load and the motor torque when the motor torque is greater than the estimated load, and when the estimated load becomes greater than the motor torque, if an absolute value of a difference between current values of the estimated load and the motor torque is smaller than the stored inertial force peak value, the pinching determination means determines that there is no pinching of an object. This can make it possible to prevent an increase in the estimated load caused by oscillatory disturbance from being erroneously detected as indicating a pinching of an object, and thus allows for a highly reliable detection of pinching. Further, it is no longer necessary to use a threshold value for pinching determination (i.e., reference load PL) with a large margin to avoid erroneous determinations that could be caused by oscillatory disturbances, and thus it is possible to increase the determination sensitivity and achieve quicker detection of pinching.

Preferably, the inertial force peak value may be cleared when a range of fluctuation of the estimated load is smaller than a prescribed value for a prescribed period. In this way, it is possible to avoid erroneously determine that there is an oscillatory disturbance when there is actually not.

The pinching determination means can set a threshold value representing an amount of acceleration-side fluctuation of the estimated load with respect to the motor torque, so that when the estimated load becomes higher than the motor torque, if an absolute value of a difference between current values of the estimated load and the motor torque is smaller than the threshold value, the pinching determination means can determine that there is no pinching of an object. This also can prevent an increase in the estimated load caused by oscillatory disturbance from being erroneously detected as indicating a pinching of an object, and thus allows for a highly reliable detection of pinching.

According to a preferred embodiment of the present invention, the pinching determination means may determine that there is a pinching of an object when a state where the estimated load is greater than a prescribed threshold value continues for a prescribed period determined by a prescribed mask quantity, where the prescribed mask quantity is variable depending on a rate of change of the estimated load. In this way, when a large disturbance causes such a fluctuation in the estimated load as exceeding the prescribed threshold value, it is possible to detect the disturbance from the changing rate of the estimated load and set an appropriate mask quantity depending on the changing rate of the estimated load, to thereby avoid erroneous determinations.

For example, the mask quantity can be a prescribed reference time, and the pinching determination means may determine that there is a pinching of an object when a state where the estimated load is greater than the prescribed threshold value continues for the prescribed reference time, where the reference time is variable depending on a rate of change of the estimated load. Such a reference time that is variable depending on the changing rage of the estimated load can effectively avoid erroneous pinching determination that could be caused by a large disturbance. Preferably, a first reference time can be set as the prescribed reference time when the rate of change of the estimated load is smaller than a prescribed value, while a second reference time that is longer than the first reference time can be set as the prescribed reference time when the rate of change of the estimated load is equal to or greater than the prescribed value. This can achieve the variable reference time with a simplified structure.

Alternatively or in addition to that, the mask quantity can be a prescribed reference amount of movement, and the pinching determination means may determine that there is a pinching of an object when an amount of movement of the closure member during a state where the estimated load is greater than the prescribed threshold value exceeds a prescribed reference amount of movement, where the reference amount of movement is variable depending on a rate of change of the estimated load. Such a reference amount of movement that is variable depending on the changing rage of the estimated load can effectively avoid erroneous pinching determination that could be caused by a large disturbance. Further, when the moving speed of the closure member is high, it is possible to reliably prevent the load at the time when the determination of pinching is made (pinching load) from becoming excessive. Preferably, a first reference amount of movement can be set as the prescribed reference amount of movement when the rate of change of the estimated load is smaller than a prescribed value, while a second reference amount of movement that is larger than the first reference amount of movement can be set as the prescribed reference amount of movement when the rate of change of the estimated load is equal to or greater than the prescribed value. This can achieve the variable reference amount of movement with a simplified structure.

In the case where the pinching determination means determines that there is a pinching of an object when a duration time during which the estimated load is continuously greater than the prescribed threshold value exceeds a prescribed reference time or when an amount of movement of the closure member during a state where the estimated load is greater than the prescribed value exceeds a prescribed reference amount of movement, it is preferred that at least one (preferably both) of the prescribed reference time and the prescribed reference amount of movement is variable depending on a rate of change of the estimated load. In this way, the reference time and reference amount of movement that are variable depending on the changing rate of the estimated load can prevent erroneous pinching determinations in the presence of disturbances.

BRIEF DESCRIPTION OF THE DRAWINGS

Now the present invention is described in the following with reference to the appended drawings, in which:

FIG. 13 is a flowchart for showing an example of the estimated load when a large impact is imparted to the vehicle.

DETAILED DESCRIPTION OF THE PREFERRED EMBODIMENTS

Figure 1:
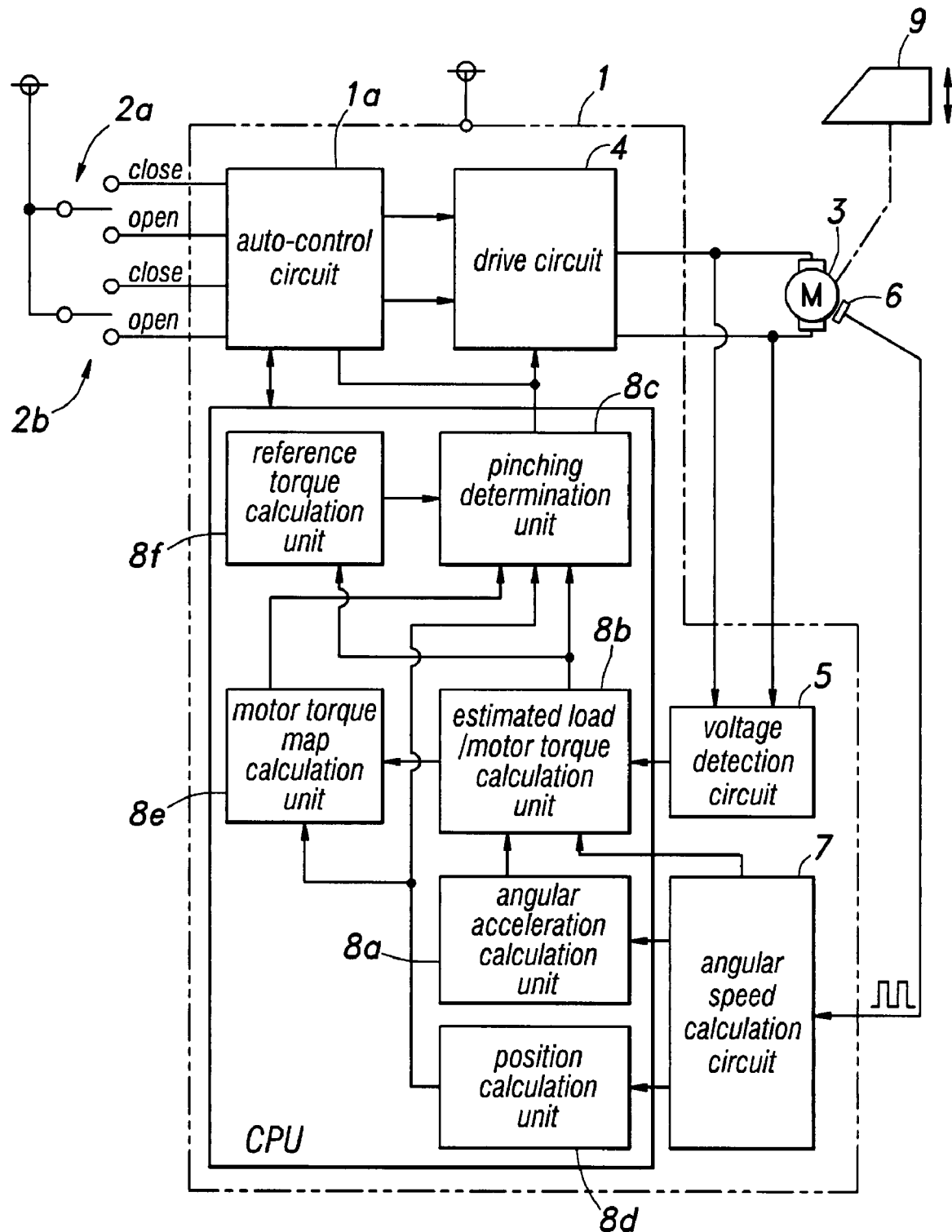
FIG. 1 is a block diagram of a motor drive control circuit for an automobile power window device to which the present invention is applied.

In the following, embodiments of the present invention will be described with reference to the appended drawings. FIG. 1 is a block diagram showing an embodiment in which the present invention is applied to an automobile power window device as a preferred embodiment of a control device for a closure member of a vehicle according to the present invention.

As shown in the drawing, a control block 1 comprises: an auto-control circuit 1a that, depending on opening/closing operation signals from an automatic operation switch 2a and manual operation switch 2b provided to a driver's seat or the like, outputs an automatic or manual opening/closing control signals; a drive circuit 4 serving as a motor drive control circuit for forward/reverse rotating a DC motor 3 in response to the opening/closing control signals; a voltage detection circuit 5 for detecting a drive voltage of the motor 3; an angular speed calculation circuit 7 for calculating the rotation speed of the motor 3 as an angular speed based on the intervals of pulse signals from a rotary sensor (or rotary encoder) 6 that operates in conjunction with the rotation of the motor 3 and serves as a rotation speed detection means; and a CPU 8 for conducting main control of the control block 1.

The CPU 8 includes: an angular acceleration calculation unit 8a for calculating an angular acceleration based on the angular speed signal from the angular speed calculation circuit 7; an estimated load/motor torque calculation unit 8b serving as an estimated load calculation means for estimating an outer load of the motor 3 based on the drive voltage, angular speed and angular acceleration as well as serving as a motor torque calculation means for calculating a toque of the motor 3 based on the drive voltage and angular speed; and a determination unit 8c for performing determination of a pinching based on the estimated load. The angular acceleration calculation unit 8a, the estimated load/motor torque calculation unit 8b and determination unit 8c can be implemented by program processing in the CPU 8.

The motor 3 is forward or reverse rotated depending on the drive signal from the drive circuit 4 whereby a windowpane 9, which is connected to the motor 3 via a link or wire, etc, and serves as a driven member, is opened/closed. The auto-control circuit 1a outputs a continuous open/close control signal when the open/close signal from the automatic operation switch 2a is input, and when the open/close signal from the manual operation switch 2b is input, the auto-control circuit 1a outputs the open/close control signal only while the switch is operated. The control of the motor 3 can be conducted using constant-voltage control or PWM control.

The CPU 8 is further provided with a windowpane position calculation unit 8d that calculates the position of the windowpane 9 in between the fully closed and fully open positions based upon the motor rotational direction and angular speed signal from the angular speed calculation circuit 7. The function of the windowpane position calculation unit 8d can be also implemented by the program processing in the CPU 8. It should be mentioned that the position of the windowpane 9 can be expressed by the pulse count from the rotation sensor 6 in such a manner that zero count corresponds to the fully open position, 2500 counts corresponds to the fully closed position, and positions between the fully closed and fully open positions correspond to count values between zero and 2500, for example.

Further, the CPU 8 comprises a motor torque map calculation unit 8e and a reference torque calculation unit 8f. The motor torque map calculation unit 8e receives the motor torque signal from the estimated load/motor torque calculation unit 8b and the windowpane position signal from the position calculation unit 8d to calculate (or update) therefrom a motor torque map, which represents a change of motor torque with respect to the position of the windowpane 9, as described in detail later. The reference torque calculation unit 8f receives the estimated load and motor torque from the estimated load/motor torque calculation unit 8b to calculate therefrom a reference torque $T_{ref}$, which represents a stationary motor toque, as described in detail later.

Figure 2:
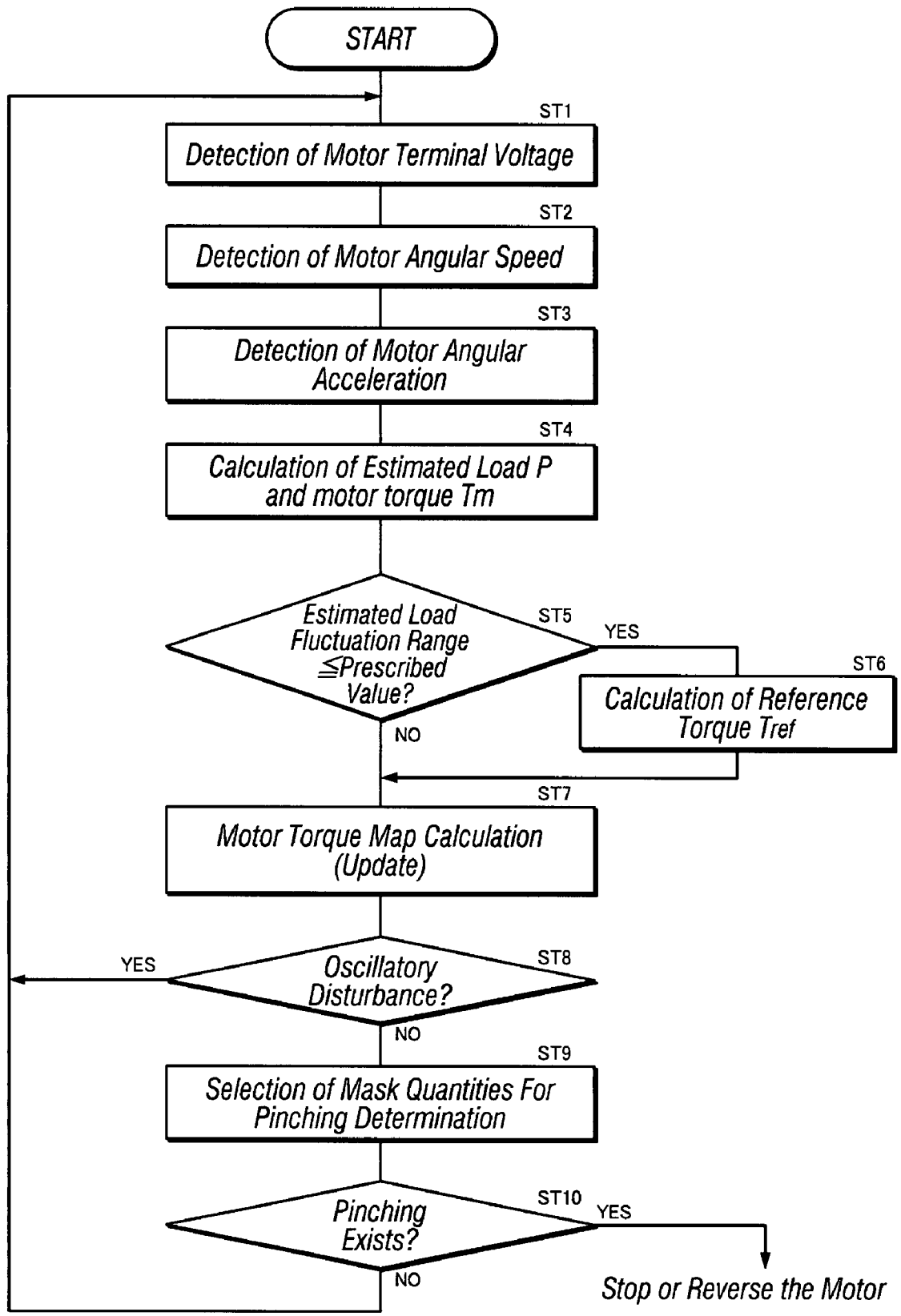
FIG. 2 is a chart showing an overall control flow according to the present invention.

FIG. 2 shows a general flow of a preferred embodiment of pinching determination control in a closing operation of the power window device constructed as above. The control flow of FIG. 2 may be carried out by program processing in the CPU 8 at a constant period of 5 ms, for example.

First, in step ST1, the terminal voltage V (effective value) of the motor 3 is detected by the voltage detection circuit 5 and AID converted, and the process goes to step ST2.

In step ST2, a cycle t is calculated from the interval between the pulse signals from the rotation sensor 6, and the angular speed ω (=2π/t) is calculated therefrom. In the next step ST3, the angular acceleration dω is calculated based upon the angular speed ω obtained in ST2, and the process proceeds to step ST4.

Figure 4:
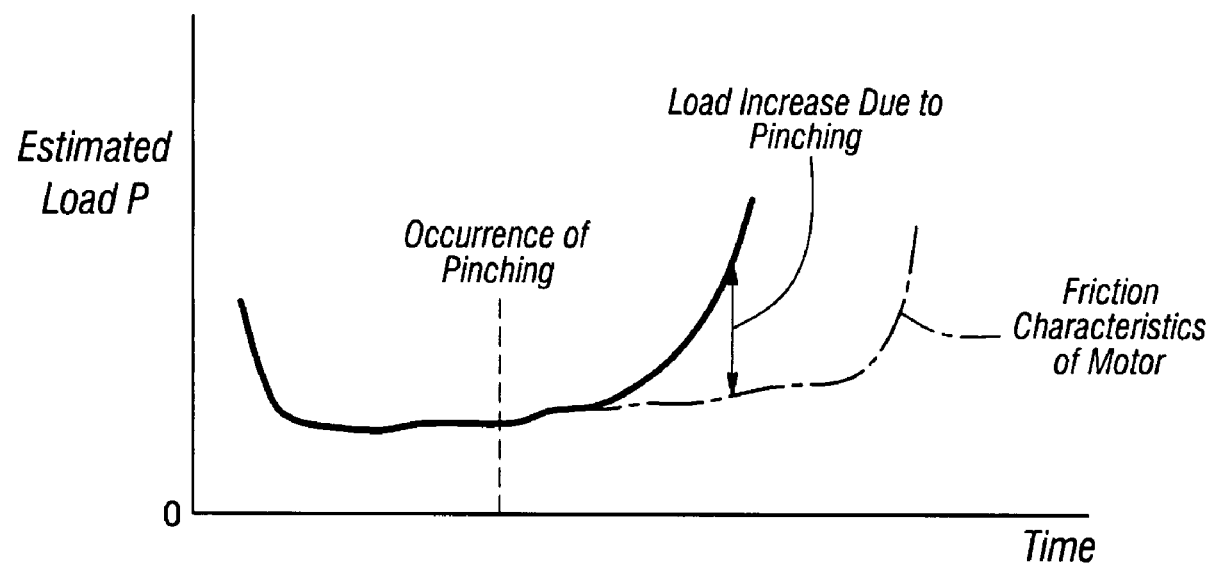
FIG. 4 is a graph showing a relationship between the estimated load and motor friction characteristics in the event of a pinching.

In step ST4, the estimated load/motor torque calculation unit 8b calculates an estimated load P, which represents an outer load of the motor 3, based on the terminal voltage V, angular speed ω, and angular acceleration dω in accordance with the above equation (1) or (3). It should be mentioned here that as shown in FIG. 4, the estimated load P in the presence of pinching is a sum of the motor friction characteristics and the load increase due to the pinching, and the motor friction characteristics can vary for different motors, and may change with time even for the same motor. Thus, in order to prevent the change in the estimated load P caused by the variation of motor characteristics among individual motors, temporal change of motor characteristics, and/or sliding load of the windowpane 9 from being erroneously recognized as indicating a pinching, it was necessary in the past to set a threshold value with a sufficient margin (i.e., set a higher threshold value) to prevent the erroneous detection. This, however, can create a problem that the load at the time of determination of pinching (pinching load) tends to be higher. In order to avoid such a problem, it is preferred if the estimated load P obtained according to the equation (1) or (3) is adjusted in step ST4 by using a motor torque map and the adjusted estimated load is used as the estimated load P in the following process. The motor torque map represents the change of motor torque with respect to the position of the windowpane 9 with no outer load (i.e., when there is no pinching). As described in detail later, the individual differences and temporal change of the motor characteristics as well as the sliding load of the windowpane 9 can be reflected upon the motor torque map by calculating the motor torque map for every closing operation of the windowpane 9. Thus, by retrieving the motor torque corresponding to the current position of the windowpane 9 from the motor torque map, which is updated at appropriate times, subtracting it from the estimated load P obtained by the equation (1) or (3), and substituting the subtracted estimated load for the estimated load P in the following process, it is possible to eliminate the affects from the individual differences and temporal change of the motor characteristics as well as from the sliding load of the windowpane 9 to thereby detect only the load increase caused by pinching, which allows for highly accurate determination of pinching. Such an adjustment of the estimated load P using the motor torque map can be optionally conducted by the pinching determination unit 8c.

In step ST4, a motor torque Tm is also calculated from the terminal voltage V and angular speed ω of the motor 3 in accordance with the above equation (2).

In step ST5, a fluctuation range of the estimated load P during a prescribed period is compared with a predetermined value, and if the fluctuation range is lower than the predetermined value (i.e., it can be judged that the device is in a stationary state where dω is sufficiently small and the estimated load P and the motor torque Tm are substantially the same), the process proceeds to step ST6 to store in a memory (not shown in the drawing) an average value of the motor torque Tm during the prescribed period as a reference torque $T_{ref}$. As described later, the reference torque $T_{ref}$ is used for preventing erroneous determination of pinching that could be caused by instability in the start-up period of the motor. It should be mentioned that if the estimated load P is adjusted by using the motor torque map in step ST4, similar adjustment should be also made to the reference torque $T_{ref}$ as well as to the motor torque Tm when they are compared with the estimated load P or to each other in the following process.

Figure 3:
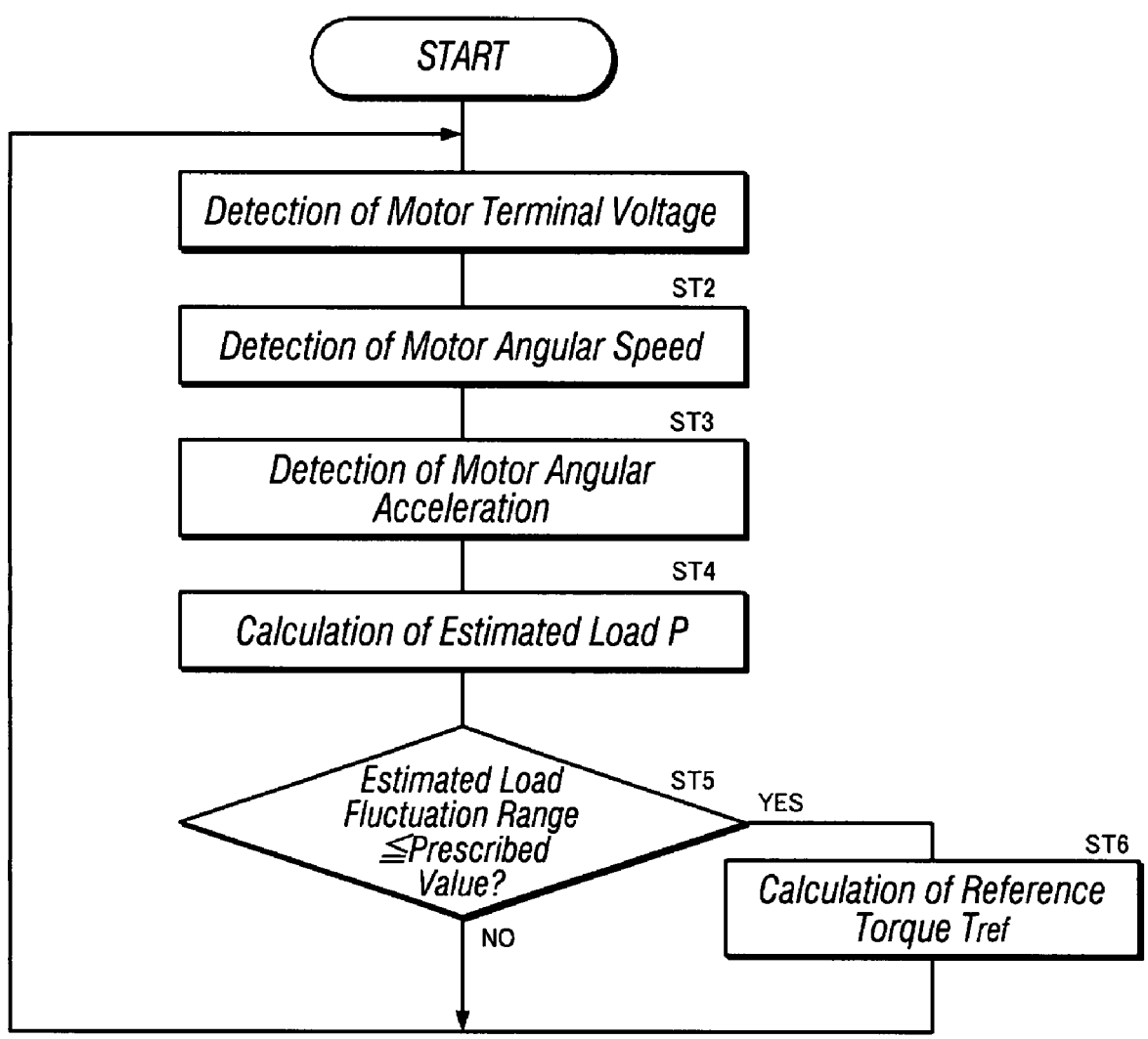
FIG. 3 is a flowchart for obtaining a reference torque $T_{ref}$ in the window opening operation.

As shown in FIG. 3, it is preferred that the calculation and storing of the reference torque $T_{ref}$ are also performed in an opening operation of the windowpane 9, whereby the reference torque $T_{ref}$ obtained in the opening operation can be used in the detection of pinching immediately after the start-up of the motor 3 in the next closing operation. In the case that the windowpane 9 is moved downward in the opening operation, the reference torque $T_{ref}$ used in the closing operation should be adjusted to take into account the load increase due to the weight of the windowpane 9 (by adding the weight, for example).

Figure 5:
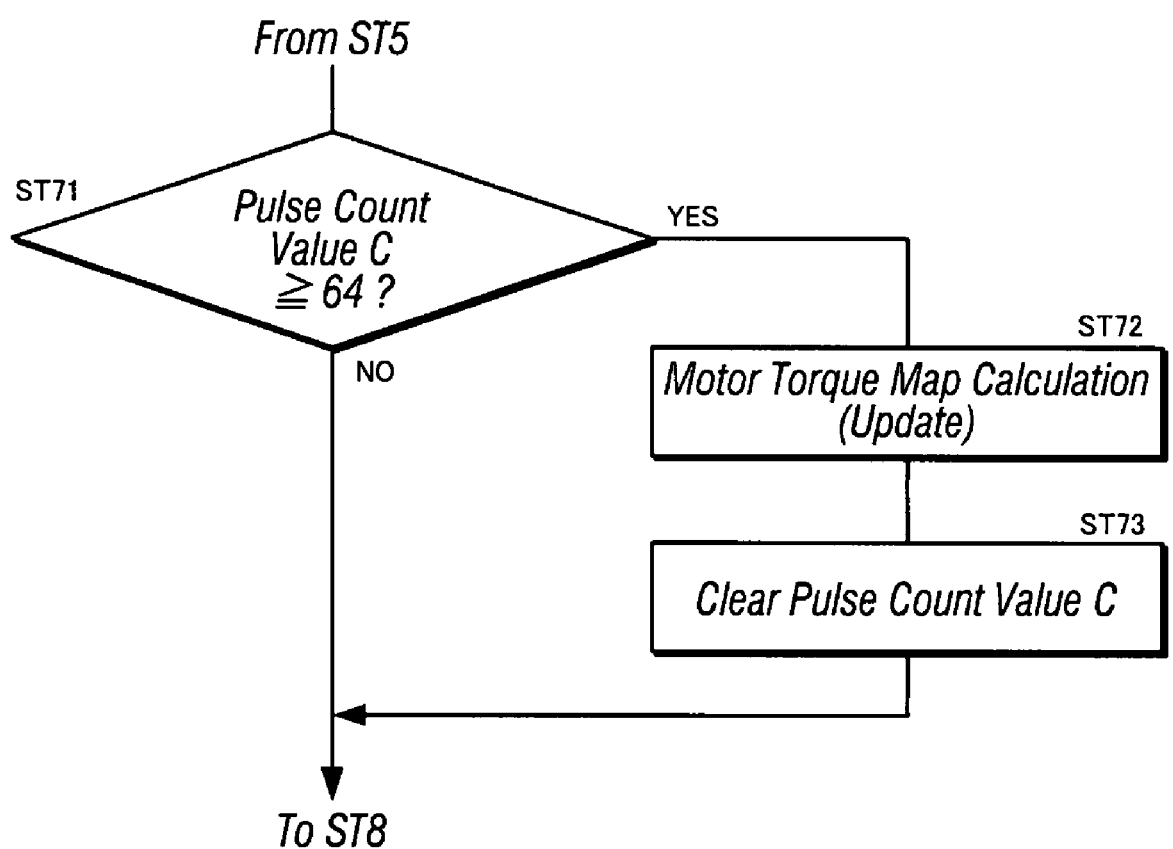
FIG. 5 is a flowchart showing a process for updating the motor torque map.

In step ST7, the above mentioned calculation (updating) of the motor torque map is conducted. FIG. 5 shows a detailed flow of the process conducted in step ST7. As shown in the drawing, a count value C of the pulse from the rotary sensor 6 is compared with a predetermined value (64, for example) in step ST71, and if the pulse count value C is equal to or greater than the predetermined value, the process goes to step ST72 where the motor torque map is calculated, and then the pulse count C is cleared at step ST73. In other words, the calculation of the motor torque map is performed about every 64 pulse counts. It should be mentioned that in order not to update the motor torque map when there is a pinching of an object, the updating of the motor torque map may be avoided (i.e., the step ST7 may be skipped) when the estimated load P is equal to or greater than a prescribed reference load PL, for example.

Figure 6:
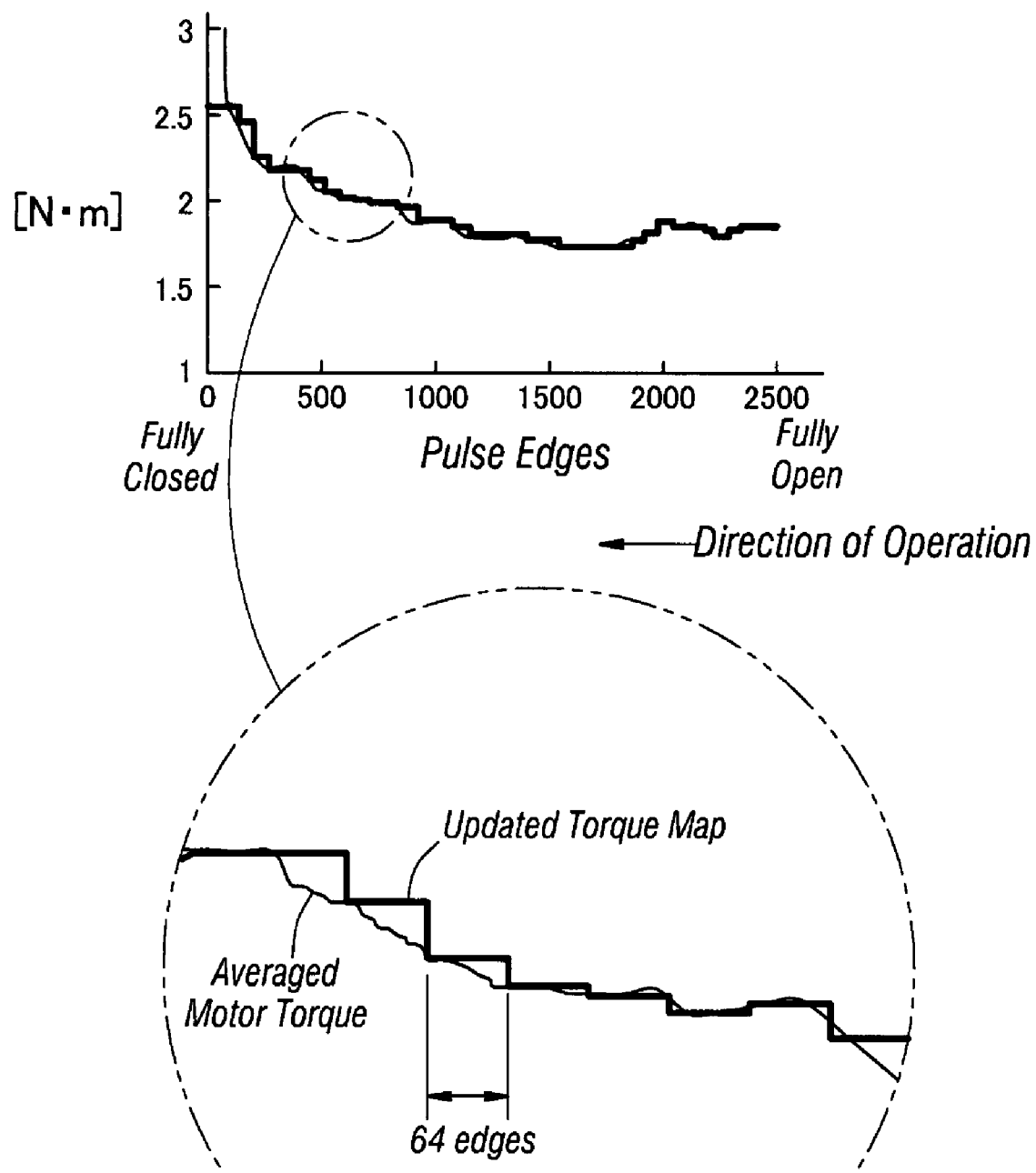
FIG. 6 is a graph showing an example of the motor torque map.

Referring to the motor torque map of FIG. 6, an averaging treatment is applied on the motor torque Tm to remove the influence of noise or the like and smooth the waveform. In step ST72, the averaged motor torque is sampled and set for the prescribed period (the period corresponding to 64 pulse edges) as a new motor torque to whereby update the motor torque map (see the enlarged view in FIG. 6). Thus, even if the motor characteristics can vary for different motors or can change with time, they can be reflected on the motor torque map by updating the motor torque map for every closing operation of the motor 3 or windowpane 9.

Figure 7:
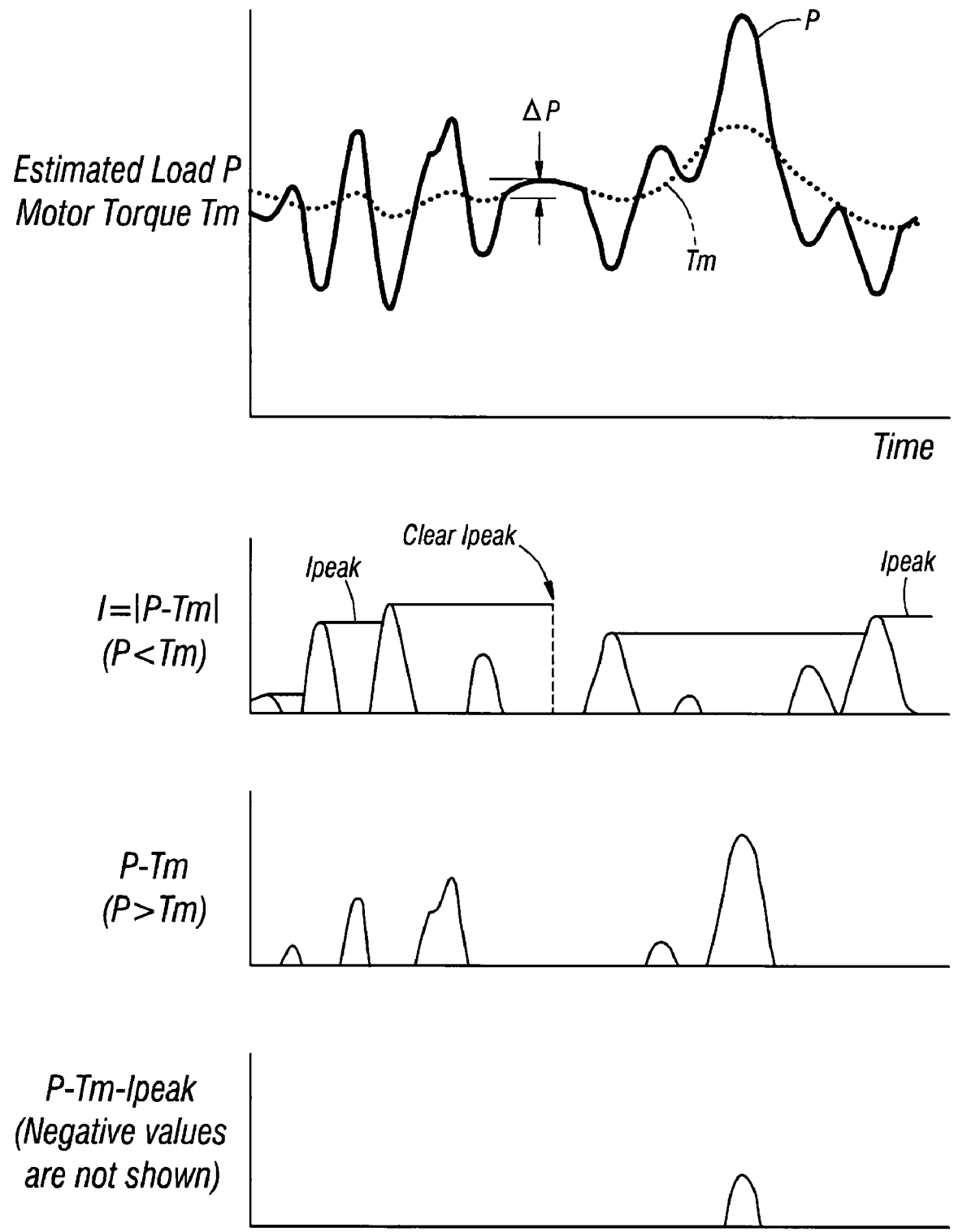
FIG. 7 is a waveform diagram showing an example of the estimated load and motor torque when there is an oscillatory disturbance.

In step ST8, a process for preventing erroneous determination of pinching due to oscillatory disturbances is performed. FIG. 7 shows an exemplary behavior of the estimated load P and motor torque Tm when an oscillatory disturbance is applied. It should be mentioned here that in the example of FIG. 7, the estimated load P is not adjusted using the motor torque map. As shown in the uppermost graph of FIG. 7, when there is an oscillatory disturbance, the angular speed ω and the angular acceleration dω fluctuate like waves and this causes the estimated load P to oscillate above and below the motor torque Tm. It is generally considered that when the estimated load P is lower than the motor torque Tm, the angular acceleration dω is positive, i.e., the motor is gaining speed while when the estimated load P is greater than the motor torque Tm, the angular acceleration dω is negative, i.e., the motor is decelerating. When the estimated load P increases beyond the motor torque Tm, there is a possibility of pinching of a foreign object but if the estimated load P was below the motor torque Tm to a comparable extent immediately before the increase in the estimated load P, it can be considered that the increase in the estimated load P is caused by oscillatory disturbance and not by pinching of a foreign object. Thus, in step ST8, when the estimated load P is below the motor torque Tm, the extend of the estimated load P below the motor torque Tm is stored as an inertial force peak value $I_{peak}$, and when the estimated load P increases above the motor torque Tm, it is compared with the stored inertial force peak value $I_{peak}$, and when it is found to be equal to or below $I_{peak}$, the increase of the estimated load P is considered to result from an oscillatory disturbance and the following pinching determination process is not performed (i.e., it is determined that there is no pinching). In other words, in this embodiment, the inertial force peak value $I_{peak}$ serves as a threshold value representing an amount of acceleration-side fluctuation of the estimated load P with respect to the motor torque Tm.

Figure 8:
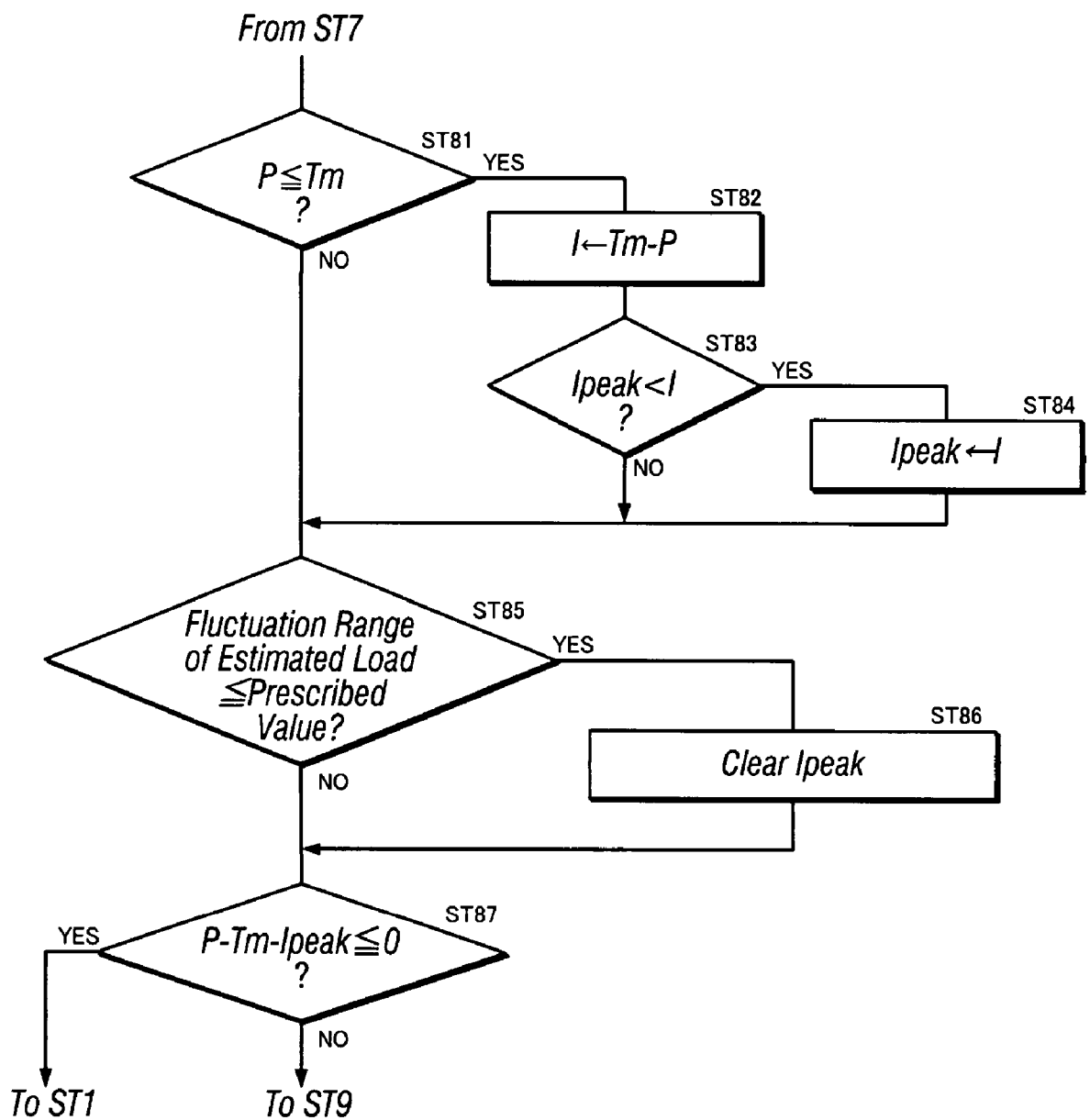
FIG. 8 is a detailed flowchart of the process for determining where or not there is an oscillatory disturbance.

FIG. 8 shows the detailed flow of the process performed in step ST8. As shown, in step ST81, the estimated load P is compared with the motor torque Tm and if P≦Tm, step ST82 computes Tm−P (or |P−Tm|) as an inertial force I (the second uppermost graph in FIG. 7). Subsequently, in steps ST83 and ST84, the inertial force peak value $I_{peak}$ is obtained. Specifically, the inertial force I is compared with the inertial force peak value $I_{peak}$ in step ST83, and if $I_{peak}$<I, then the process goes to step ST84 where the current inertial force I is made to be a new inertial force peak value $I_{peak}$. In step ST85, it is determined whether or not a fluctuation range ΔP of the estimated load P during a prescribed period is equal to or below a predetermined value, and if it is the case, step ST86 clears the inertial force peak value $I_{peak}$. This is because when the fluctuation range of the estimated load P is small, it is considered that there is no oscillatory disturbance. In step ST87, the motor torque Tm and the inertial force peak value $I_{peak}$ are subtracted from the estimated load P, and if the result is equal to or below zero, it is determined that the increase in the estimated load P is caused by an oscillatory disturbance and the process returns to step ST1, while if the result is greater than zero, it is judged that there is a possibility of pinching of an object and the process goes to the next step ST9. In the example of FIG. 7, the lowermost graph shows only the case where the P−Tm−$I_{peak}$ is positive. Thus, when the estimated load P increases beyond the motor torque Tm, if, immediately before that, the estimated load P is below the motor torque Tm to a similar extent, it is determined that the increase in the estimated load is caused by an oscillatory disturbance and the following pinching determination process is not performed. This can avoid erroneous determinations or considerably reduce the number of erroneous determinations.

Subsequently in step ST9, mask quantities (time and amount of movement of the windowpane) for pinching determination are selected, and the process proceeds to step ST10.

Figure 9:
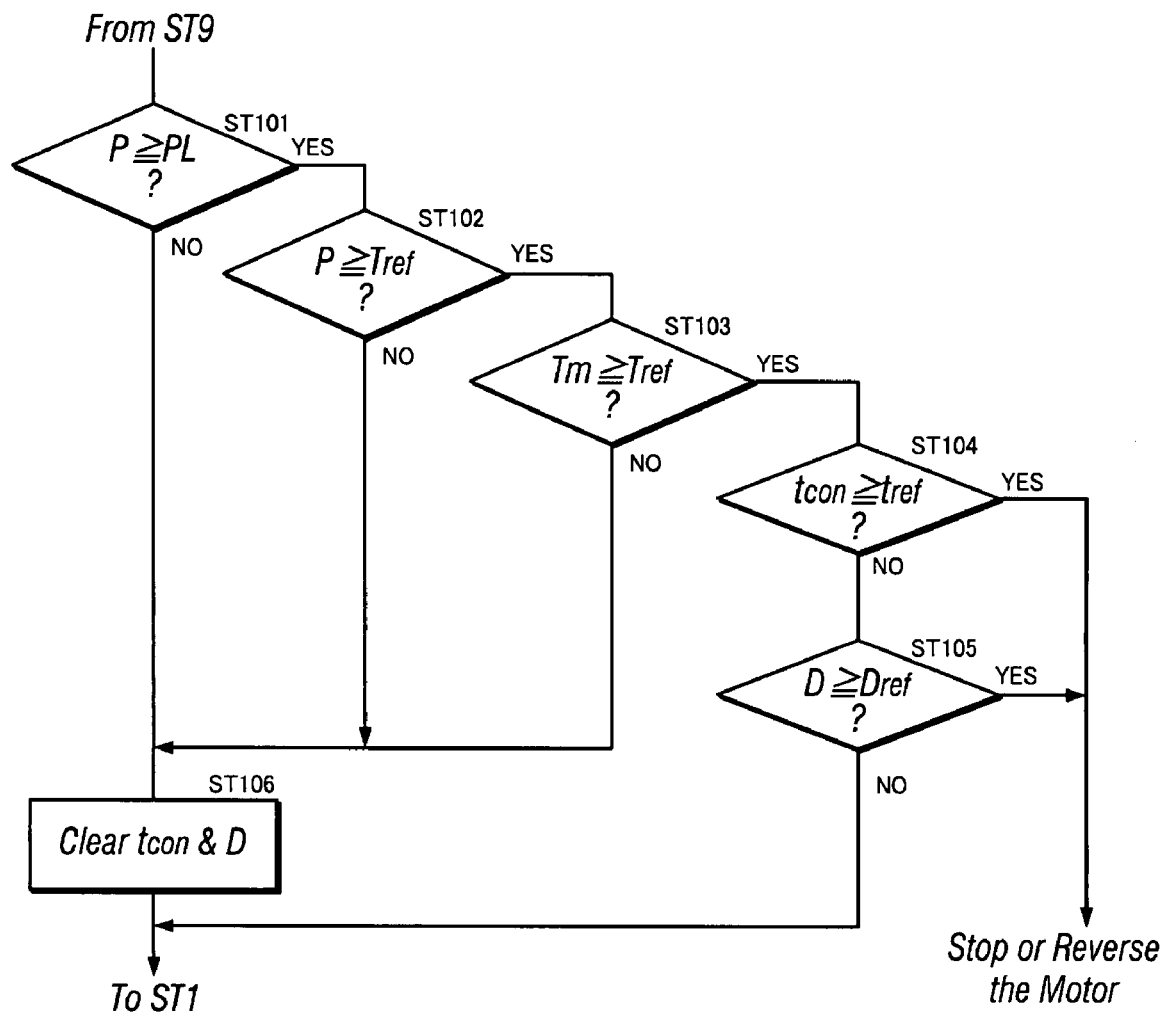
FIG. 9 is a detailed flowchart of the pinching determination process.

In step ST10, pinching determination process is performed using the estimated load P. FIG. 9 shows the detailed flow of the process performed in step ST10. As shown in the drawing, in step ST101, the estimated load P is compared with a prescribed reference load PL, and if P≧PL, the process goes to step ST102, and if not, the process goes to step ST106. In step ST102, the estimated load P is compared with the reference torque $T_{ref}$ obtained in step ST6, and if P≧$T_{ref}$, the process goes to step ST103 and if not, the process goes to step ST106. In step ST103, the motor torque Tm is compared with the reference torque $T_{ref}$, and if $Tm \geq T_{ref}$, the process goes to step ST104 and if not, the process goes to step ST106. In step ST104, a duration time $t_{con}$ during which the three conditions in steps ST101, ST102 and ST103 are continuously fulfilled is compared with a prescribed reference time (or mask time) $t_{ref}$, and if $t_{con} \geq t_{ref}$, it is determined that there is a pinching of an object and the motor 3 is stopped or reverse rotated. If the condition $t_{con} \geq t_{ref}$ does not hold in step ST104, then in step ST105, an amount of movement D of the windowpane 9 for a time period during which the three conditions in steps ST101, ST102 and ST103 are continuously fulfilled is compared with a prescribed amount of movement (or mask amount of movement) $D_{ref}$, and if $D \geq D_{ref}$, it is determined that there is a pinching of an object and the motor 3 is stopped or reverse rotated, while if not, the process returns to step ST1. In step ST106, the duration time $t_{con}$ and amount of movement D are cleared (i.e., their values are set to zero). It should be mentioned that the amount of movement D of the windowpane 9 can be preferably expressed by the number of pulses from the rotation sensor 6 that represents the amount of rotation of the motor 3.

Figure 10:
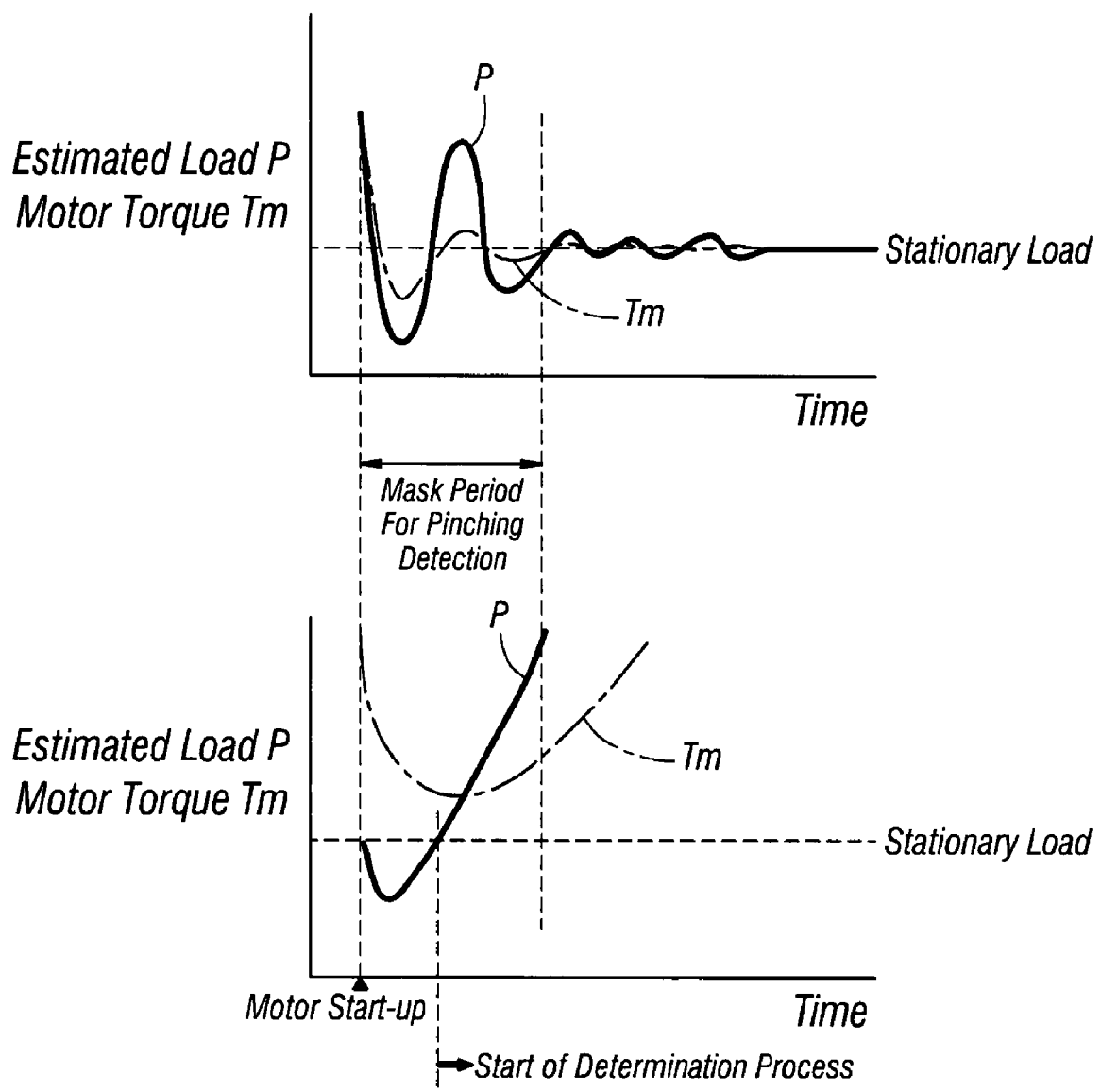
FIG. 10 is a waveform diagram showing an example of a load change at the motor start-up.

As described above, in the present embodiment, only when both of the estimated load P and the motor torque Tm are equal to or greater than the reference torque (stationary torque) $T_{ref}$, the pinching determination process is continued and if the conditions are not met, it is determined that there is no pinching. As shown in the upper graph of FIG. 10, because the operation is unstable immediately after the start-up of the motor 3, fluctuation of the angular speed ω and the angular acceleration dω can fluctuate the motor load (estimated load P) considerably even when there is no pinching and motor torque Tm has not increased. Therefore, if the pinching determination were performed only based on the estimated load P, it would tend to result in an erroneous determination that there is a pinching of an object when actually there is not. For this reason, a mask period was provided in the past so as not to start pinching determination process until the motor load becomes stable. However, as shown in the lower graph of FIG. 10, in the case where a pinching has already occurred at the start-up of the motor 3, the load would start to increase promptly after the start-up of the motor and the mask period would delay the determination of pinching, leading to a larger load at the time of determination of pinching (pinching load). In contrast, according to the above embodiment of the present invention, a determination that there is a possibility of pinching is made and the pinching determination process is continued only when a condition that both of the estimated load P and the motor torque Tm are equal to or greater than the reference torque (stationary torque) $T_{ref}$ is met in addition to the criteria that the estimated load P is equal to or greater than the prescribed threshold value PL. Therefore, even when the pinching determination process is started from immediately after the start-up of the motor 3 without a mask period, it is possible to prevent or significantly reduce the number of erroneous pinching determinations due to fluctuation of the angular speed ω and angular acceleration dω. Thus, it is possible to preferably perform the pinching determination process from immediately after the start-up of motor 3 without providing a mask period after the motor start-up.

Figure 11:
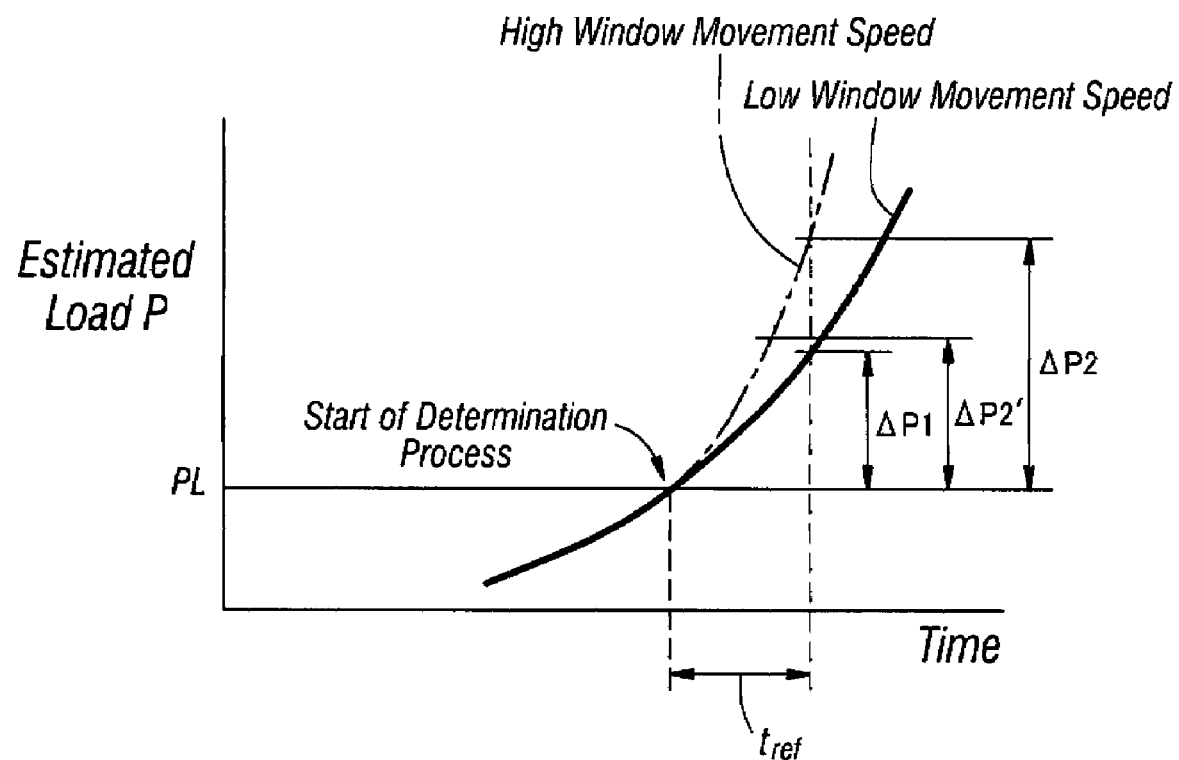
FIG. 11 is a graph for explaining a pinching detection for different window movement speeds.

Further in the above embodiment, in addition to that a determination of pinching is made when $T_{con} \geq t_{ref}$ holds in step ST104, a determination of pinching is also made when $D \geq D_{ref}$ holds in step ST105. As shown in a graph of FIG. 11, if the pinching determination were performed solely depending on the duration time $t_{con}$, during which the estimated load P is continuously above the reference load PL, with a low movement speed of the windowpane 9 (a solid line in FIG. 11), a load increase ΔP1 at the time of determination of pinching would be small and thus there would be no problem, but with a high movement speed and hence with a high rate of increase of the load (a phantom line in FIG. 11), a load increase ΔP2 by the time of determination of pinching could be excessively large. In the above embodiment, however, when the upward movement speed of the windowpane 9 is high, it can be determined that there is a pinching and make the motor 3 stop or reverse-rotate when the amount of movement D of the windowpane 9 from when the estimated load P becomes greater than the reference load PL exceeds the reference amount of movement $D_{ref}$ even before the duration time $t_{con}$, from when the estimated load P becomes greater than the reference load PL reaches the reference time $t_{ref}$. Therefore, it is possible to suppress the load increase by the time of determination of pinching (e.g., ΔP2' in FIG. 11).

Figure 12:
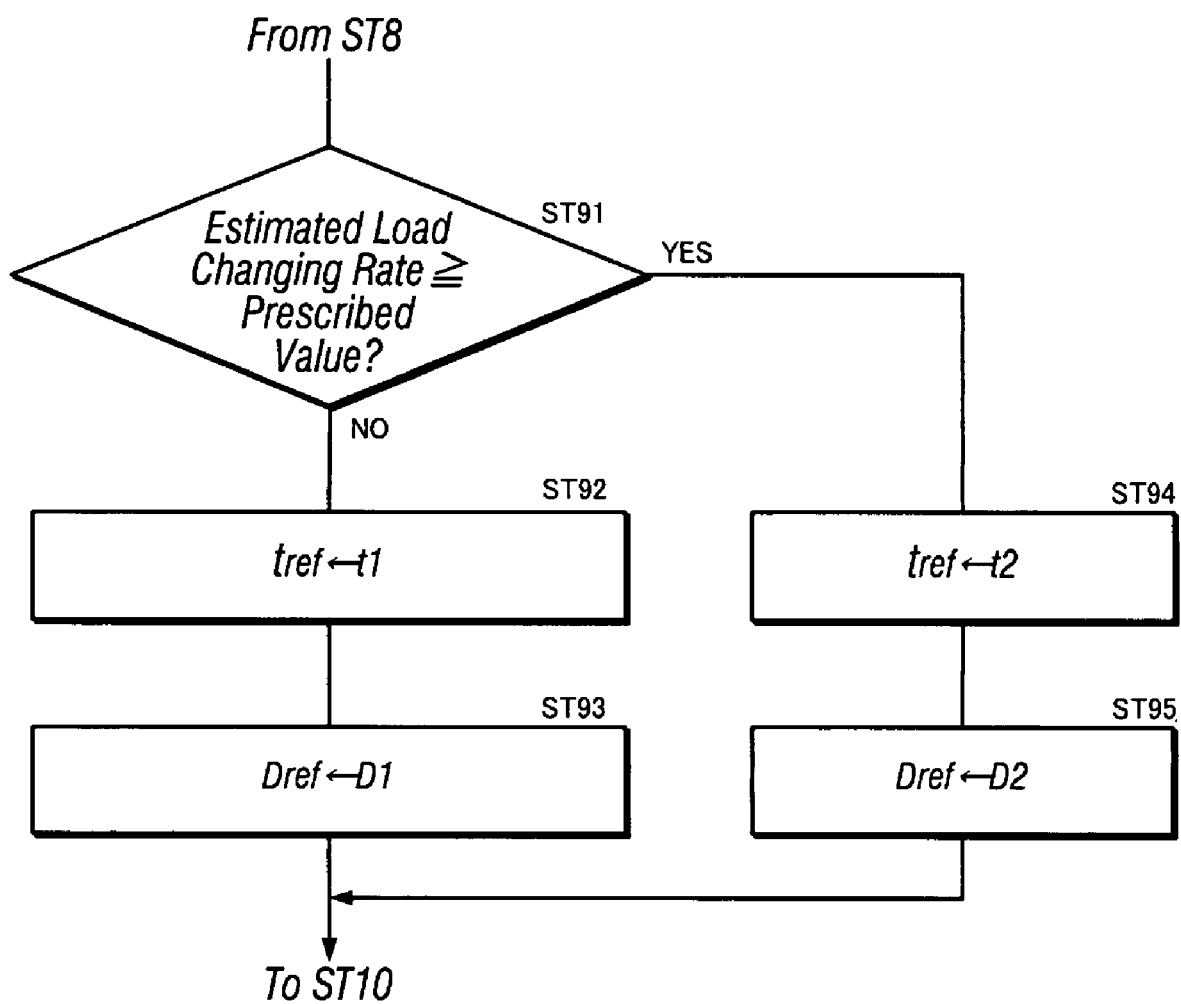
FIG. 12 is a flowchart for showing a process for selecting threshold values for pinching determination.

Next, an explanation is made to the selection of mask quantities for determination (i.e., the reference time $t_{ref}$ and the reference amount of movement $D_{ref}$) in step ST9. FIG. 12 shows a detailed flow of the process conducted in step ST9. As shown in the drawing, in step ST91, it is determined whether or not the rate of change of the estimated load P is equal to or greater than a prescribed value, and if not, the process goes to step ST92, where a first reference time t1 is input to the reference time for determination $t_{ref}$ and then in step ST93, a first reference amount of movement D1 is input to the reference amount of movement for determination $D_{ref}$. In the case that the changing rate of the estimated load P is equal to or greater than the prescribe value in step ST91, the process goes to step ST94 where a second reference time t2 is input to the reference time for determination $t_{ref}$ and then in step ST95, a second reference amount of movement D2 is input to the reference amount of movement for determination $D_{ref}$. It should be noted here that t1<t2 and D1<D2. For example, t1 may be 20 ms, t2 may be 60 ms, D1 may be 12 counts (pulse number), and D2 may be 36 counts (pulse number). In the above described steps ST104 and ST105, the reference time for determination $t_{ref}$ and the reference amount of movement for determination $D_{ref}$ selected as above are used, respectively, to determine presence/absence of pinching. It should be noted that the changing rate of the estimated load P can be preferably obtained by the following equation:

Changing Rate of Estimated Load=|Previous Estimated Load−Current Estimated Load|÷(Number of Pulses Per Control Cycle) (4)

FIG. 13 shows an example of the estimated load P when a temporary large impact is applied to the vehicle such as when a door of the vehicle is slammed shut. As shown in the drawing, the estimated load P increases at a high rate and exceeds the reference load PL at one point, at which the pinching determination process is started. When such a large impact is imparted, an erroneous determination could result if the determination were made using the relatively-short first reference time t1. However, as described above, when the changing rate of the estimated load P is equal to or greater than a prescribed value, the second reference time t2, which is longer than the first reference time t1, can be used in the determination to thereby prevent erroneous pinching detection. The same applies to the reference amount of movement $D_{ref}$ (i.e., D1 or D2).

Although the present invention has been described in terms of particular embodiments thereof, these embodiments are for illustrative purposes only and the present invention should not be limited by the embodiments. For example, the present invention was applied to the power window device of an automobile in the above embodiments, but the present invention may be applicable to an electric slide door of a motor vehicle.

Further, if the reference load PL in step ST101 is equal to or greater than the reference torque $T_{ref}$ in step ST102, step ST102 may be omitted because in such a case, if the condition estimated load P≧reference torque PL is met, then the condition estimated load P≧reference torque $T_{ref}$ is always met.

The control device for a closure member of a vehicle according to the present invention can conduct a pinching determination process from immediately after the start-up of a motor for driving the closure member without applying a mask period, and thus is quite beneficial as a control device for an automobile power window device, for example.

The disclosure of the original Japanese patent application (Japanese Patent Application No. 2006-62060 filed on Mar. 8, 2006) on which the Paris Convention priority claim is made for the present application is hereby incorporated by reference herein in its entirety.

The invention claimed is:

1. A control device for a closure member of a vehicle that drives the closure member with a DC motor, comprising:
   rotation speed detection means for detecting a rotation speed of the motor;
   voltage detection means for detecting a drive voltage of the motor;
   acceleration calculation means for calculating an acceleration of the motor from the rotation speed of the motor;
   estimated load calculation means for obtaining an estimated load from the rotation speed, acceleration, and drive voltage of the motor;
   motor torque calculation means for calculating a motor torque from the rotation speed and drive voltage of the motor;
   reference torque calculation means for calculating a reference torque based on a stationary state of the motor torque and storing the reference torque in a memory; and
   pinching determination means for determining a pinching of an object based on the estimated load, the motor torque and the reference torque, wherein the pinching determination means determines that there is no pinching when at least one of the estimated load and the motor torque is below the reference torque even when the estimated load is greater than a prescribed threshold value, wherein the pinching determination means determines that there is a pinching of an object when a duration time during which the estimated load is continuously greater than the prescribed threshold value exceeds a prescribed reference time or when an amount of movement of the closure member during a state where the estimated load is greater than the prescribed threshold value exceeds a prescribed reference amount of movement.

2. The control device for a closure member of a vehicle according to claim 1, wherein the reference torque calculation means calculates the reference torque in both of an opening operation and a closing operation of the closure member.

3. The control device for a closure member of a vehicle according to claim 2, wherein the closure member is moved in an up-down direction with the opening operation of the closure member being a downward movement of the closure member, and the reference torque calculated in the opening operation is adjusted based on a weight of the closure member when the reference torque is used in the pinching determination in the closing operation of the closure member.

4. The control device for a closure member of a vehicle according to claim 1, wherein the reference torque is calculated by the reference torque calculation means when a state where a fluctuation range of the estimated load is within a prescribed range continues for a prescribed time period, wherein the reference torque is calculated as an average value of the motor torque in the prescribed time period.

5. The control device for a closure member of a vehicle according to claim 1, further comprising motor torque map calculation means for calculating a motor torque map in every closing operation of the closure member, where the motor torque map represents a change of motor torque with respect to a position of the closure member,
   wherein the pinching determination means adjusts the estimated load by subtracting therefrom a motor torque obtained by referring to the motor torque map based on the position of the closure member, and performs the pinching determination based on the adjusted estimated load.

6. The control device for a closure member of a vehicle according to claim 5, wherein the motor torque map calculation means calculates an average value of the motor torque for every prescribed period, and set the average value of the motor torque to the corresponding prescribed period as an updated motor torque.

7. The control device for a closure member of a vehicle according to claim 1, further comprising motor torque map calculation means for calculating a motor torque map based on a changing state of the motor torque,
   wherein the pinching determination means adjusts the estimated load according to the motor torque map, and performs the pinching determination based on the adjusted estimated load.

8. The control device for a closure member of a vehicle according to claim 1, wherein the pinching determination means stores, as an inertial force peak value, a peak value of an absolute value of a difference between the estimated load and the motor torque when the motor torque is greater than the estimated load, and when the estimated load becomes greater than the motor torque, if an absolute value of a difference between current values of the estimated load and the motor torque is smaller than the stored inertial force peak value, the pinching determination means determines that there is no pinching of an object.

9. The control device for a closure member of a vehicle according to claim 8, wherein the inertial force peak value is cleared when a range of fluctuation of the estimated load is smaller than a prescribed value for a prescribed period.

10. The control device for a closure member of a vehicle according to claim 1, wherein the pinching determination means sets a threshold value representing an amount of acceleration-side fluctuation of the estimated load with respect to the motor torque, and when the estimated load becomes higher than the motor torque, if an absolute value of a difference between current values of the estimated load and the motor torque is smaller than the threshold value, the pinching determination means determines that there is no pinching of an object.

11. The control device for a closure member of a vehicle according to claim 1, wherein the pinching determination means determines that there is a pinching of an object when a state where the estimated load is greater than a prescribed threshold value continues for a prescribed period determined by a prescribed mask quantity, and the prescribed mask quantity is variable depending on a rate of change of the estimated load.

12. The control device for a closure member of a vehicle according to claim 11, wherein the mask quantity is a prescribed reference time, and the pinching determination means determines that there is a pinching of an object when a state where the estimated load is greater than the prescribed threshold value continues for the prescribed reference time, where the reference time is variable depending on a rate of change of the estimated load.

13. The control device for a closure member of a vehicle according to claim 12, wherein a first reference time is set as the prescribed reference time when the rate of change of the estimated load is smaller than a prescribed value, while a second reference time that is longer than the first reference time is set as the prescribed reference time when the rate of change of the estimated load is equal to or greater than the prescribed value.

14. The control device for a closure member of a vehicle according to claim 11, wherein the mask quantity is a prescribed reference amount of movement, and the pinching determination means determines that there is a pinching of an object when an amount of movement of the closure member during a state where the estimated load is greater than the prescribed threshold value exceeds a prescribed reference amount of movement, where the reference amount of movement is variable depending on a rate of change of the estimated load.

15. The control device for a closure member of a vehicle according to claim 14, wherein a first reference amount of movement can be set as the prescribed reference amount of movement when the rate of change of the estimated load is smaller than a prescribed value, while a second reference amount of movement that is larger than the first reference amount of movement can be set as the prescribed reference amount of movement when the rate of change of the estimated load is equal to or greater than the prescribed value.

16. The control device for a closure member of a vehicle according to claim 1, wherein at least one of the prescribed reference time and the prescribed reference amount of movement is variable depending on a rate of change of the estimated load.

* * * * *